United States Patent Office 3,544,690
Patented Dec. 1, 1970

3,544,690
METHOD OF CONTROLLING FUNGI WITH HALODINITROBENZOTRIFLUORIDE COMPOUNDS
Quentin F. Soper, Indianapolis, Ind., assignor to Eli Lilly and Company, Indianapolis, Ind., a corporation of Indiana
No Drawing. Filed July 7, 1966, Ser. No. 563,359
Int. Cl. A01n 9/20
U.S. Cl. 424—349                              9 Claims

ABSTRACT OF THE DISCLOSURE

Methods for the control of fungi in soil employing as active agent halodinitrobenzotrifluoride compounds.

DETAILED DESCRIPTION OF THE INVENTION

This invention relates to novel methods for the control of soil fungi. More particularly, it relates to novel fungicidal methods and compositions in which a chlorodinitrobenzotrifluoride is the fungicidally active ingredient.

Many plant-pathogenic fungi are found in soil, where they cause considerable loss of agricultural and horticultural crops. Often these fungi prevent entirely the germination of seeds planted in the infected soil; and even when germination occurs, the resulting seedlings often do not develop into healthy plants. The organisms which affect plants in this manner are known as seedling-blight or damping-off fungi. An example is *Rhizoctonia solani*. Another example of a damping-off fungus is *Pythium spp.* The roots of a large number of plants including avocado, pine, pineapple, heather, camellia, rhododendron, cinchona, chestnut, peach, yew, a number of deciduous and coniferous nursery trees, and Lawson cypress are severely affected by yet another fungus, *Phytophthora cinnamomi*. Fusarium root rot, caused by *Fusarium solani*, damages the roots of a number of plants. The vascular system of cowpeas, which are utilized for hay, soil improvement, and food in the southeastern part of the United States, is adversely affected by *Fusarium oxysporium f. tracheiphilum*, which also causes plants such as tomato to wilt and die. *Sclerotium rolfsii*, a causative organism involved in root rots, has a coarse, rapidly growing mycelium which attacks many vegetable crops and sugar beets. While there are many compounds in current use for controlling such fungi, there still exists the need for improved soil fungicides capable of controlling fungal pathogens which have become resistant to most known fungicides. Fungicides are needed which are more persistent in action and of lower phytotoxicity than those presently known.

It is an object of the present invention to make available a new method for the control of fungi as well as novel compositions which are nontoxic to plants and animal life. A further object is to provide novel processes for inhibiting the growth of fungi in agricultural soils.

It has been found that the application of an effective amount of at least one of the compounds of the formula:

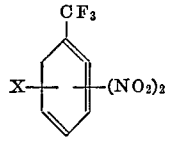

wherein X is halo,
to the soil wherein plants are grown protects the plants therein against fungal pathogens.

Halo can be illustratively chlorine, bromine, iodine, and fluorine.

Compounds useful in the practice of this invention include but are not limited to the following:

2-chloro-3,5-dinitrobenzotrifluoride
4-chloro-3,5-dinitrobenzotrifluoride
4-iodo-3,5-dinitrobenzotrifluoride
4-fluoro-3,5-dinitrobenzotrifluoride
5-chloro-2,4-dinitrobenzotrifluoride
5-iodo-2,4-dinitrobenzotrifluoride
2-fluoro-3,5-dinitrobenzotrifluoride
2-iodo-3,5-dinitrobenzotrifluoride
3-chloro-4,6-dinitrobenzotrifluoride
3-iodo-4,6-dinitrobenzotrifluoride
3-bromo-2,6-dinitrobenzotrifluoride
3-fluoro-4,6-dinitrobenzotrifluoride
4-bromo-3,5-dinitrobenzotrifluoride, and the like.

The compounds useful in this invention are known compounds whose preparations are described by Friedrich et al., U.S. Pat. 2,257,093 (Sept. 30, 1941).

In general, in the novel processes of this invention a compound represented by the above formula is applied directly to the soil at the rate of from about 1 to about 120 lb. per acre, preferably about 1 to about 60 lb. per acre, broadcast rate. The compound can be incorporated into and mixed with the soil by raking, disking, harrowing, or the like. Alternatively, the compound can be introduced into the soil in furrows or trenches, or injected into the soil by methods well known to the art. Thus, the compound is brought into contact with the plant pathogenic fungi infesting the soil.

The compounds can be applied to the soil directly or they can be diluted with various inert solids or liquid diluents and then applied to the fungus-infested area. When the subject compounds are relatively insoluble in water, they are most conveniently formed into fungicidal compositions by extending them with a carrier material or conditioning agent of the kind used and commonly referred to in the art as a fungicidal adjuvant or modifier. The adjuvants are normally employed singly and include inert solids, hydrocarbon liquid diluents, and surface-active agents. They provide compositions adapted for ready and efficient application using conventional applicator equipment. Usually from about 0.5 to about 15 percent by weight of the total formulated composition is active ingredient.

Solid compositions are conveniently prepared in the form of powders. They are compounded to be homogeneous powders that can be used as such, diluted with inert solids to form dusts, or suspended in a suitable liquid medium for spray application. The powders usually comprise the active ingredient admixed with suitable amounts of conditioning agents. Natural clays and other powdered carriers such as attapulgite, china clay, diatomaceous earth, synthetic fine silica, calcium silicate, and other inert solid carriers of the kind conventionally employed can be used. For conversion of the powders to dusts, talc, pyrophyllite, volcanic ash, and other dense, rapid-settling inert solids customarily are used. Preferably, such powder compositions are used promptly after being made.

Example 1.—The solid fungicidal properties of the compositions of the present invention were evaluated by an in vitro test against *Fusarium oxysporum f. tracheiphilum*, *Phytophthora cinnamomi*, *Rhizoctonia solani*, and *Verticillium albo-atrum* according to the following general method:

Ordinary greenhouse soil was screened through a sieve (mesh size 8) and 100 g. portions placed in clean No. 60 Mason jars. Disposable paper partitions were inserted through the soil in each jar to provide four separate compartments therein. The jars were then closed and sterilized for 45 minutes at 121° C. Each compartment was inoculated with a single test organism grown on white clover seeds. Eight to 12 pathogen-infested seeds were mixed into the soil in each compartment. Thirty mg. of the test compound were weighed out and placed in a glass vial. The compound was dissolved in 0.5 ml. of ethanol or micropulverized with a spatula for suspension and then brought up to a volume of 20 ml. with aqueous 0.1 percent polyoxyethylenesorbitan monolaurate solution. The test solutions were sprayed into the jars by a modified De Vilbiss atomizer under 10 p.s.i. air pressure. This initial screening was at the rate of 300 mcg. of compound per gram of oven-dried soil (equivalent to 60 lb. per acre, calculated on a broadcast basis). The jars were placed in an incubation room and kept at 70° F. for five days.

Under the warm, moist conditions of the test, growth of the fungi was favored, and in the control jars containing no fungicidal compound, the fungus mycelium was observed to grow and completely cover the clover seeds with a coating easily visible through the glass of the jar. In those jars containing the fungicidal compounds, the mycelium grew sparsely or was not present. The effectiveness of the fungicidal compound was rated accordingly.

At the end of five days the jars were examined and the overall fungicidal activity of the compound recorded as shown in Chart 1. In the chart, Column 1 gives the name of the compound under test; Column 2, the name of the test organism; and Columns 3, 4, 5, 6, 7, and 8, the fungus inhibition ratings corresponding to application rates of 60, 30, 15, 7.5, 3.75, and 1.8 lb. per acre, respectively.

The following rating scale was employed: Rating of 1—no fungus inhibition (indistinguishable from the untreated control); rating of 2—slight fungus inhibition; rating of 3—moderate fungus inhibition; rating of 4—moderately complete fungus inhibition; rating of 5—completely fungus inhibition.

| Compound | Test organism | Application rate (lb./A.) | | | | | |
|---|---|---|---|---|---|---|---|
| | | 60 | 30 | 15 | 7.5 | 3.75 | 1.8 |
| 2-chloro-3,5-dinitrobenzo trifluoride | Fusarium | 5 | 5 | 5 | 5 | 1 | 1 |
| | Pythium | 5 | 5 | 5 | 5 | 5 | 5 |
| | Rhizoctonia | 5 | 5 | 5 | 5 | 5 | 1 |
| | Verticillium | 5 | 5 | 5 | 5 | 5 | 5 |
| 4-chloro-3,5-dinitrobenzo-trifluoride | Fusarium | 5 | 4 | 3 | 1 | 1 | |
| | Pythium | 5 | 5 | 4 | 3 | 1 | |
| | Rhizoctonia | 5 | 5 | 4 | 4 | 3 | |
| | Verticillium | 5 | 3 | 3 | 1 | 1 | |
| 4-fluoro-3,5-dinitrobenzo-trifluoride | Fusarium | 5 | 5 | 1 | 1 | | |
| | Pythium | 5 | 5 | 5 | 1 | | |
| | Rhizoctonia | 5 | 4 | 1 | 5 | | |
| | Verticillium | 5 | 5 | 4 | 1 | | |
| Control | Fusarium | 1 | 1 | 1 | 1 | 1 | 1 |
| | Pythium | 1 | 1 | 1 | 1 | 1 | 1 |
| | Rhizoctonia | 1 | 1 | 1 | 1 | 1 | 1 |
| | Verticillium | 1 | 1 | 1 | 1 | 1 | 1 |

*Example 2.*—The soil fungicidal properties of three compounds were evaluated in the greenhouse for their efficacy against *Fusarium solani f. phaseoli*, the causative organism of beam root rot, using the following method:

The soil for this test was obtained from a greenhouse bench which is maintained as a source of soil naturally infested with fungi. The soil was screened to remove all organic debris and these diluted with an equal quanity of monsterile greenhouse soil.

A sufficient quantity of the compound to be tested was weighed out to provide a broadcast rate equivalent to 30 lb. per acre and placed in a jar. The compound was dissolved or micropulverized in 0.5 ml. of a mixture of acetone-ethanol (50:50 by volume) and the volume of the mixture brought up to 5 ml. by adding aqueous 0.1 percent polyoxyethylenesorbitan monolaurate solution. Three grams of diatomaceous earth were added to the solution to serve as a carrier. One-hundred-fifty grams of Fusarium-infested soil were placed in the jar and thoroughly incorporated with the test chemical by rolling the closed jar on the roller for three minutes. The contents of the jar were then transferred to a 3-inch pot, planted with four seeds of the Bountiful variety of snapbeans, and placed in the greenhouse. Each treatment was replicated three times. Inoculated and uninoculated controls were also run in each test. At the end of 14 days, the pots were examined, the degree of protection noted as in Example 1, and the results recorded as shown in Chart 2. In the chart, Column 1 gives the name of the compound under test; Column 2, the application rate in pounds per acre on a broadcast basis; and Column 3, the disease ratings corresponding to application rates of 30, 15, and 7.5 lb. per acre, respectively.

CHART 2

| Compound | Rate (lb./A.) | Disease rating |
|---|---|---|
| Uninoculated control | 0 | 5 |
| Inoculated control | 0 | 1 |
| 2-chloro-3,5-dinitrobenzotrifluoride | 30 | 5 |
| | 15 | 4 |
| | 7.5 | 1 |
| 4-chloro-3,5-dinitrobenzotrifluoride | 30 | 5 |
| | 15 | 4 |
| | 7.5 | 4 |
| 5-chloro-2,4-dinitrobenzotrifluoride | 30 | 5 |
| | 15 | 4 |
| | 7.5 | 4 |

*Example 3.*—Following the procedure of Example 2, 2-chloro-3,5-dinitrobenzotrifluoride was evaluated at lower application rates for its ability to control *Fusarium solani f. phaseoli*, the causal organism of bean root rot. The results of the test are shown in Chart 3.

CHART 3

| Compound | Rate (lb./A.) | Disease rating |
|---|---|---|
| 2-chloro-3,5-dinitrobenzotrifluoride | 4 | 5 |
| | 2 | 4.5 |
| | 1 | 4 |
| Inoculated control | 0 | 1 |

*Example 4.*—Another greenhouse test was run to evaluate the efficacy of certain of the compounds of the invention in the control of *Pythium debaryanum*, a species of fungi responsible for Pythium Damping-off.

A sufficient quantity of each compound to be tested was weighed out to provide a broadcast rate equivalent to 30 lb. per acre and placed in a separate jar. The compound was dissolved or micropulverized in 0.5 ml. of a mixture of acetone-ethanol (50:50 by volume) and the volume brought up to 5 ml. of adding aqueous 0.1 percent polyoxyethylenesorbitan monolaurate solution. Three grams of diatomaceous earth were added to each solution to serve as a carrier. One-hundred-fifty grams of Pythium-infested soil were placed in each jar and thoroughly incorporated with the test chemical by rolling the closed jar for three minutes. The contents of each jar were then transferred to a separate three-inch pot and planted with 10 seeds of the Coker 100 A variety of cotton, and each pot was placed on a greenhouse cart. The pots were covered with a polyethylene sheet and placed in the growth cubicle at a temperature of 65° F. for a period of 72 hours. The polyethylene cover was then removed and the cotton seedlings allowed to grow.

At the end of 14 days the pots were examined and the overall fungicidal activity of the compounds reported as shown in the accompanying Chart 4.

CHART 4

| Compound | Rate (lb./A.) | Disease rating |
|---|---|---|
| Uninoculated control | 0 | 5 |
| Inoculated control | 0 | 1 |
| 2-chloro-3,5-dinitrobenzotrifluoride | 30 | 5 |
| | 15 | 4 |
| | 7.5 | 4 |
| 4-chloro-3,5-dinitrobenzotrifluoride | 30 | 55 |
| | 15 | 5 |
| | 7.5 | 4 |
| 5-chloro-2,4-dinitrobenzotrifluoride | 30 | 5 |
| | 15 | 5 |
| | 7.5 | 5 |

*Example 5.*—4-chloro-3,5-dinitrobenzotrifluoride was field-tested to evaluate its efficacy against *Sclerotium rolfsii*, the causative organism of Southern Blight in Spanish-type peanuts. The procedure was as follows:

The field, naturally infested with fungi, was divided into a series of plots, each plot containing peanuts, planted in two rows 36 inches apart and 100 feet long. Three replicates of each experiment were run. The peanuts were planted on July 8 by the direct-seeded method; and, on the same day, the test compound, 4-chloro-3,5-dinitrobenzotrifluoride, formulated as a dust, was applied with a Gustafson dust applicator. There were also control plots to which no fungicide was applied.

On August 3, twenty-seven days after the date of planting, the growing plants were examined for evidences of injury to the plants, the following rating scale being employed: Rating of 0—no injury; rating of 1 to 3—slight injury; rating of 4 to 6—moderate injury; rating of 7 to 9—severe injury; rating of 10—death. The results are shown in Chart 5:

CHART 5

| Compound | Formulation | Rate (lb./A.) | Crop injury rating |
|---|---|---|---|
| 4-chloro-3,5-dinitrobenzotrifluoride | 1.0% dust | 3.0 | 0 |
|  | 2.0% dust | 6.0 | 0 |
|  | 5.0% dust | 15.0 | 0 |
| Control | | 0.0 | 0 |

The treated plants unexpectedly appeared more uniform in height with healthier color and development than the plants in the control plots.

On October 15, the growing plants were again examined for evidences of infection by the fungus, the results being shown in Chart 6, where Column 4 gives the disease incidence rating as the mean percent infection according to the Barratt-Horsfall Rating Scale.

CHART 6

| Compound | Formulation | Rate (lb./A.) | Disease indicence rating, mean percent infection |
|---|---|---|---|
| 4-chloro-3,5-dinitrobenzotrifluoride | 1.0% dust | 3.0 | 3.90 |
|  | 2.0% dust | 6.0 | 4.68 |
|  | 5.0% dust | 15.0 | 5.46 |
| Control | | 0 | 66.67 |

When the crop had matured, it was harvested on November 23, and the yields of peanuts from the treated plots compared with the yields from the control plots. These results are shown in Chart 7.

CHART 7

| Compound | Formulation | Rate (lb./A.) | Yield (lb./A.) |
|---|---|---|---|
| 4-chloro-3,5-dinitrobenzotrifluoride | 1.0% dust | 3.0 | 2642.6 |
|  | 2.0% dust | 6.0 | 2584.6 |
|  | 5.0% dust | 15.0 | 265.2 |
| Control | | 0 | 2410.3 |

I claim:
1. A method of controlling pathogenic plant fungi in agricultural soil which comprises contacting the fungi with a fungicidal amount of a compound of the formula:

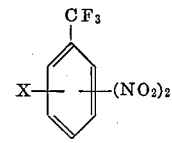

wherein X is halo.

2. The method of claim 1 wherein the fungicidal compound is 2-chloro-3,5-dinitrobenzotrifluoride.
3. The method of claim 1 wherein the fungicidal compound is 4-chloro-3,5-dinitrobenzotrifluoride.
4. The method of claim 1 wherein the fungicidal compound is 5-chloro-2,4-dinitrobenzotrifluoride.
5. The method of claim 1 wherein the fungicidal compound is used in combination with an inert diluent.
6. The method of claim 1 wherein the fungicidal compound is used in combination with an inert diluent and a wetting agent.
7. The method of claim 1 wherein the fungicidal compound is used in the form of a composition containing within the range of about 0.5 percent to about 15 percent, by weight, of fungicidally active ingredient.
8. The method of claim 1 wherein the fungicidal compound is employed at a rate of from about 1 to about 120 pounds per acre.
9. The method of claim 1 wherein the fungicidal compound is employed at a rate of from about 1 to about 60 pounds per acre.

References Cited

UNITED STATES PATENTS

| | | | |
|---|---|---|---|
| 1,947,926 | 2/1934 | Steindorff et al. | 167—30X |
| 2,121,330 | 6/1938 | Scherer et al. | 167—30 UX |
| 2,519,317 | 8/1950 | Kolka et al. | 167—30X |
| 2,839,444 | 6/1958 | Ligett et al. | 167—30 |
| 3,062,706 | 11/1962 | Kohn | 167—30 |

OTHER REFERENCES

Lobor et al.: Chem. Abs., 1965, vol. 63, pp. 10596.

Hinman: Journal of Economic Entomology, August 1954, vol. 47, No. 4, pp. 553 relied upon, pp. 549–556.

ALBERT T. MEYERS, Primary Examiner

D. R. ORE, Assistant Examiner

U.S. Cl. X.R.

424—357

PO-1050
(5/69)

UNITED STATES PATENT OFFICE
CERTIFICATE OF CORRECTION

Patent No. 3,544,690        Dated December 1, 1970

Inventor(s) Quentin F. Soper

It is certified that error appears in the above-identified patent and that said Letters Patent are hereby corrected as shown below:

In column 3, line 37, the first word "completely" shou be --complete--; in line 58, the third word "beam" should be --bean--; and in line 63, the first word "monsterile" should --nonsterile--.

In Chart 4, in the last column, the sixth entry "55" s be --5--.

In Chart 7, in the last column, the third entry "265.2 should be --2657.2--.

Signed and sealed this 4th day of May 1971.

(SEAL)
Attest:

EDWARD M. FLETCHER, JR.
Attesting Officer

WILLIAM E. SCHUYLER
Commissioner of Pat